Patented Sept. 27, 1949

2,483,323

UNITED STATES PATENT OFFICE 2,483,323

METHOD OF PREPARING PHENYL ETHYL ALCOHOL

Leonard Nicholl, Nyack, William Bitler, Haverstraw, and Thomas Carl Aschner, New Rochelle, N. Y., assignors to Kay-Fries Chemicals, Inc., West Haverstraw, N. Y., a corporation of New York No Drawing. Application August 1, 1945, Serial No. 608,374

9 Claims. (Cl. 260—618)

This invention relates to the preparation of aromatic alcohols from aromatic hydrocarbons and alkylene oxides, in the presence of an acid condensing agent, and, more particularly, to the preparation of phenyl ethyl alcohol from benzene and ethylene oxide in the presence of an acid condensing agent, such as, aluminum chloride.

Hitherto, there have been a number of procedures proposed for the preparation of phenyl ethyl alcohol, according to the Friedel and Crafts reaction, from benzene and ethylene oxide, using aluminum chloride for the synthesis. A number of important disadvantages are centered upon the processes as illustrated in the literature, a fundamental disadvantage being the ready formation of undesirable by-products, such as dibenzyl, which require careful purification steps in order to render the phenyl ethyl alcohol fit for its intended uses. The prior art has taught increasing the amount of certain of the reagents, and varying the reaction conditions, such as imposing superatmospheric pressures and introducing inert gases into the system. All of the proposed steps which are well known in the patent art, involve added manipulations which run into considerable time, equipment and money.

It has now been found that all of these disadvantages of the prior art can be overcome and aromatic alcohols, including phenyl ethyl alcohol prepared directly and economically and in a condition of substantial purity, by reacting the reagents under vacuum, and at a moderately low temperature, whereby the undesired side reactions and products of the prior art are substantially completely avoided.

The objects of the invention therefore include the direct preparation of phenyl ethyl alcohol and other aromatic alcohols from alkylene oxides such as ethylene oxide, propylene oxide, and butylene oxide, and aromatics including benzene, toluene and xylene, in the presence of an acid condensing agent, including aluminum chloride, and preferably under a vacuum of 40-50 mm., the alkylene oxide being added at a time rate and under conditions such that it is never present in unreacted form in the bath or reaction mixture.

To sum up, there has been a profound and substantial advance in the art of making aromatic alcohols, including phenyl ethyl alcohol, which involves the wholly unexpected reaction of minimal amounts, approximating stoichiometrical quantities of reactants, in contrast to the great excesses of the same, hitherto required, and under conditions such that no extra or excess alkylene oxide is ever present in the reaction mixture.

Considering the specific details of the process of the present invention and with particular reference to the preparation of phenyl ethyl alcohol, ethylene oxide is admitted, under vacuum, to a reaction vessel containing a slight excess of aluminum chloride, suspended in a bath of benzene (95% to 300% excess). The ethylene oxide is introduced into the reaction bath through a fritted glass delivery tube, or its equivalent, in the form of substantially minute bubbles, and, when imposing a vacuum of 40-50 mm. on the system, a much lower concentration of ethylene oxide at the gas-liquid interfaces of the bubbles is obtained than could be obtained by using a 1-1 or even 1-2 mixture of ethylene oxide and an inert gas. The concentration of gas as proposed herein amounts to somewhat less than one-tenth of the concentration corresponding to that at normal pressure.

By adding the ethylene oxide, in the form of myriads of minute bubbles, to the mixture of benzene and aluminum chloride under a vacuum of 40-50 mm. and at temperatures of approximately 9-13° C., yields of approximately 75 to 80 percent of theory of phenyl ethyl alcohol are obtained. The phenyl ethyl alcohol obtained showed 98-100% purity when tested by acetylation.

The process herein offers the advantages that:

1. It is possible to cool the reaction mixture and absorb the heat of the reaction by cooling the vapors of benzene from the reaction mixture without excessive loss of benzene, since no non-condensible gases are passed through the condenser. This is cheaper, on large scale production, than to cool the reaction mixture through a jacket on the still body.

2. By using this procedure less benzene and a much smaller excess of aluminum chloride may be used than is required in the processes of the prior art.

3. The reaction may be run at 9-13° C., which is somewhat higher than the temperature generally indicated in the prior art (5° C.).

4. The process herein may be best considered by reference to the following typical examples which do not necessarily embody the optimum ratios of reagents or conditions:

*Example 1.*—600 grams of benzene (7.7 moles) and 225 grams of anhydrous lump aluminum chloride (1.5 moles plus 2% to 10% excess) are placed in a 1000 cc. three necked flask, set up with a sealed agitator, and provided with a good condenser and a thermometer. Additionally, a fritted glass delivery tube is provided for the ethylene oxide. The aluminum chloride may be contained in a basket or container suspended in the bath and the delivery end of the fritted glass delivery tube desirably disposed in the midst or middle of the body of aluminum chloride. The bath or body of benzene and aluminum chloride are cooled to approximately 10–15° C. and the water in the condenser is maintained at a temperature of approximately 5° C. A vacuum of approximately 50 mm. is put on the system and 66 grams of ethylene oxide (1½ moles) are gradually added to the reaction mixture. The rate of addition is such that the concentration of gas present in the gas is always less than one-tenth ($\frac{1}{10}$) the concentration corresponding to normal pressure. The benzene will reflux slowly so that the heat of reaction may be taken up by vaporizing the benzene and condensing it at 5° C. The reaction continues over a period of approximately three to four hours which is required for the incremental addition of the ethylene oxide, as myriads of minute bubbles, so that the gas is never present in the body of the liquid as a gas, but only in the gas-liquid interface of the bubbles initially formed upon the introduction of the gas into the body of the liquid. The specific time required for the addition of the ethylene oxide will depend to a considerable extent on the efficiency of cooling. Because the gas has been slowly introduced, no extra amounts of free ethylene oxide are ever present to enter into side reactions with the intermediate aluminum chloride addition compounds formed.

After all the ethylene oxide has been added the reaction mixture is then agitated for an additional hour and at the same temperature namely 10–12° C. By this time practically all the aluminum chloride will have gone into solution. By suspending the aluminum chloride in a foraminous container in the bath or body of benzene and introducing the reagent gas, ethylene oxide, into immediate contact with the body of aluminum chloride the desired reaction takes place immediately and the intermediate reaction product is carried out of the reaction zone by the aspirating effect of the introduced gas. Approximately .1–.2 mole of HCl per mole of ethylene oxide comes off from the reaction mixture, and may be caught in a suitable trap. The intermediate product formed will be dispersed into the body of liquid and if the aluminum chloride is suspended in a funnel or chimney in the bath a desirable circulation of the benzene may be started up flowing over and around the body of aluminum chloride and into the main bath of the benzene thereby thoroughly removing and diluting the products of reaction as soon as they are formed and, in any event, immediately withdrawing the intermediate compounds from any further contact or attack by ethylene oxide. Where the aluminum chloride is thoroughly dispersed in the body of the benzene the desirable result will be obtained but constant agitation will be required. With the establishment of a special or specific reaction zone the tendency for side reactions will be substantially done away with, as closer control of reaction conditions will be permitted.

After the reaction has been completed the reaction mixture is hydrolyzed in the usual manner, in an equal weight of ice and water, the temperature during hydrolysis being maintained at the optimum temperature of 10–15° C. The water layer is separated and the oil layer washed with dilute sodium carbonate solution and then distilled. From the 66 grams of ethylene oxide there were obtained a total of 137 grams of phenyl ethyl alcohol of a purity of 99–100% alcohol by acetylation, and having a boiling range of 128–130° C. at a pressure of 28 mm.

In a second experiment the preparation of phenyl ethyl alcohol was carried out with appreciably less excess of ethylene oxide and less benzene than used hereinabove. In this preparation 600 grams of benzene and 270 grams of aluminum chloride (2.02 mols) were loaded into a liter flask which was provided with a water-cooled condenser maintaining a temperature of 4 to 5° C., a thermometer, an agitator, and a fritted glass tipped delivery tube for the introduction of ethylene oxide. Additionally, an eductor or aspirating tube is used to produce a vacuum of 45–50 mm. After loading the benzene and aluminum chloride into the flask, a circulating pump was started, and then the eductor, so that a vacuum of 45–50 mm. was maintained on the system. Ethylene oxide was then added from a cooled supply, including a pressure bottle, the fritted glass delivery tube being maintained well under the surface of the reaction mixture. The agitator was started and vigorous agitation was maintained. The ethylene oxide was added at such a rate that the temperature of the reaction mixture was maintained substantially between 9–11° C. and never exceeded 13° C. The time of addition for the gas was approximately four hours. Upon completion of the addition, the reaction mixture was agitated at the same low temperature for an additional hour, by which time substantially all the aluminum chloride had gone into solution. The total volume of the reaction mixture does not appear to change during the reaction. The aluminum chloride and ethylene oxide were reacted in equivalent amounts. During the reaction approximately .1–.2 mole of hydrochloric acid per mole of ethylene oxide is liberated from the reaction mixture and may be caught in a suitable trap. When the reaction is complete, the reaction mixture is slowly run into and under the surface of an equal weight of ice and water, the mixture being agitated, and when there is no more evidence of exothermic reaction, the reaction mixture, after further agitation, is allowed to separate into two layers. At this time the temperature of the mixture may rise to 50° C. The upper layer is washed with about one-third its volume of 3% sodium carbonate solution, separated and then fractionated. The excess benzene is taken off over a stillhead at atmospheric pressure and the residue fractionated through a small packed column at 28–30 mm. A small low boiling cut is obtained weighing approximately six grams and boiling at 50° C. at a pressure of 30 mm. This is followed by the main fraction which distills at 125–131° C. under a pressure of 28 mm. and yields 183–188 grams, a yield of 75% based on the amount of aluminum chloride and ethylene oxide used. The main fraction distills to dryness with practically no residue. The crude product has a fair odor. Tested by acetylation, it ran 98–100% phenyl ethyl alcohol. Other similar runs have given yields as high as 80%, with a total average yield of above 78%.

Under the improved conditions of operation permitted by the novel vacuum processing and introduction of the alkylene oxide at low pressures, and under conditions such that no excess oxide is ever present in the reaction mixture, it has been found that very radical reductions in the amount of reagents normally called for in the Friedel and Crafts reaction can be made use of. A series of experiments along the lines indicated hereinabove have shown that the operative minimum proportion of benzene would be about 450 grams of benzene to 270 grams of aluminum chloride and 90 grams of ethylene oxide. It will be noted that this represents approximately 190% excess of benzene.

In the experiment recited immediately above, it will be noted that the excess of benzene was approximately 285%. Still lower excesses of benzene have been used, with good results, even as low as 95% excess of benzene. Under such conditions, that is, with such a very slight excess of this particular reagent for this type of reaction, difficulties are met with due to the fact that the viscosity of the reaction mixture is greatly increased and the aluminum chloride does not dissolve so readily in the reaction mixture. However, yields of approximately 52% of phenyl ethyl alcohol of high purity have been obtained from using this minimum excess of benzene. But, it will be appreciated, the excess of benzene has been reduced to 95–300% as against prior art teachings of minimum requirements of substantially 600% or more. All of this in addition to the fact that due to the conducting of the operation under vacuum and the special method of introducing the alkylene oxide, no undesirable side reactions or by-products are formed or met with.

The experiments and runs recited hereinabove were duplicated with homologs of benzene, including toluene and xylene. In each instance an approximately equi-molar amount of aluminum chloride and ethylene oxide were used. Also some 300% excess of the aromatic hydrocarbons was used. Under these substantially duplicated conditions, a yield of 70% of isomeric alcohols was obtained from toluene and a yield of 72% of mixed isomeric alcohols was obtained from xylene. In the toluene experiment the product alcohol showed a purity of 99% by acetylation, and in the case where xylene was used, the product alcohol showed a purity of 96% by acetylation. Thus it will be seen that the benzene homologs react in substantially the same manner and form and yield the same high degree of pure product as does benzene. The radical variation in the condition of the Friedel and Crafts reaction, as recited above, proves that the novel process herein is generally applicable in this reaction and to give products of exceptionally high purity which are uncontaminated with any undesired by-product as the formation of the latter is essentially precluded due to the rigid maintenance of the reaction conditions suitable solely for the formation of the desired main product. This is due, in no small amount, to the fact that the alkylene oxide, whether it be ethylene oxide, propylene oxide or butylene oxide, is introduced into the reaction mixture only in such quantities that it is immediately reacted and is never present in an excess, not even a momentary excess. Due to the high vacuum imposed and maintained on the system, the gas is presented in a very highly attenuated condition, the desirable attenuation being of the order of one-tenth that corresponding to the concentration occurring in the reaction mixture at any one time. With the alkylene oxide immediately reacted upon presentation to the reaction mixture, there is no opportunity for such oxide to further react with any product of reaction. In other words, the alkylene oxide always reacts with fresh aromatic hydrocarbons and in the presence of substantially fresh amounts of aluminum chloride suspended or dispersed in the aromatic hydrocarbons.

From the foregoing it will be appreciated that there has been provided a novel improvement in the conduct of the standard Friedel and Crafts reaction. This improvement comprehends the carrying out of the reaction of an alkylene oxide, such as ethylene oxide, propylene oxide and butylene oxide on an aromatic hydrocarbon, such as benzene, toluene and xylene, and in the presence of aluminum chloride, in approximately stoichiometrical amounts or slight excesses thereof, which feature is of great novelty in this particular field, as the standard teachings have required great excesses of the reagents and catalysts in order to secure enough of the desired reaction compound, due to the formation of undesired or side compounds. Furthermore, the improvements herein are rendered possible by carrying out the process under moderate cooling, and in a closed system, under vacuum, so that condensation of the benzene or other aromatic hydrocarbons is facilitated, with autogenous cooling, and the introduction of the alkylene oxides, which are highly reactive, is made possible at so low a concentration that any alkylene oxide introduced into the reaction bath never gets beyond the stage of initial bubble formation, but is immediately reacted at the gas-liquid interface of the initially formed bubbles.

What is claimed is:

1. A process for the manufacture of aromatic alcohols which comprises preparing a mixture of an acid condensing agent comprising aluminum chloride, in an aromatic hydrocarbon, establishing and maintaining a vacuum of 40–50 mm. on the body of the reactants, and then introducing an alkylene oxide into the mixture and at a rate below the normal reaction speed, whereby the alkylene oxide is instantaneously reacted on contact with the liquid.

2. A process according to claim 1 in which the temperature of the reaction mixture is maintained at 10–12° C.

3. The process of preparing aromatic alcohols which comprises establishing a body of a mixture of aromatic hydrocarbons of the group consisting of benzene and its homologs, and an acid condensing agent comprising aluminum chloride, maintaining a vacuum of 40–50 mm. on the mixture, and introducing ethylene oxide into the mixture at a rate below its normal reaction speed.

4. The process of preparing aromatic alcohols which comprises establishing a body of a mixture of aromatic hydrocarbons of the group consisting of benzene and its homologs, and an acid condensing agent comprising aluminum chloride, maintaining a vacuum of 40–50 mm. on the mixture, and introducing propylene oxide into the mixture at a rate below its normal reaction speed.

5. The process of preparing aromatic alcohols which comprises establishing a body of a mixture of aromatic hydrocarbons of the group consisting of benzene and its homologs, and an acid condensing agent comprising aluminum chloride, maintaining a vacuum of 40–50 mm. on the mixture, and introducing butylene oxide into the mixture at a rate below its normal reaction speed.

6. The process for the production of phenyl ethyl alcohol which comprises preparing a reaction mixture of aluminum chloride in an excess of benzene, at 10–12° C., establishing a vacuum of 40–50 mm. on the system, and introducing ethylene oxide into the reaction mixture at a rate below its normal reaction speed, whereby it is immediately reacted and is not present, as such, in the body of the reaction mixture.

7. The process for the production of phenyl ethyl alcohol which comprises reacting ethylene oxide on benzene in the presence of aluminum chloride, at about 10–12° C., and under a vacuum of 40–50 mm., the ethylene oxide being added at a rate below its normal reaction speed to a mixture of the benzene and aluminum chloride, whereby the concentration of the gas in the reaction mixture is always less than one-tenth of that corresponding to existing atmospheric pressure.

8. A process according to claim 7 in which the vaporized benzene is refluxed by condensing at 5° C., and the ethylene oxide is added over a time period of three to four hours.

9. The process of preparing phenyl ethyl alcohol which includes the steps of maintaining a body of aluminum chloride in a bath of benzene maintained under a vacuum of 40–50 mm. and at a temperature of 10–12° C., and introducing substantially stoichiometrical amounts of ethylene oxide, relative to the aluminum chloride, into the bath at a rate below its normal reaction speed, in direct contact with the aluminum chloride, over a time period of three to four hours, the concentration of the ethylene oxide gas in the system being always less than one-tenth of that corresponding to existing atmospheric pressure.

LEONARD NICHOLL.
WILLIAM BITLER.
THOMAS CARL ASCHNER.

REFERENCES CITED

The following references are of record in the file of this patent:

UNITED STATES PATENTS

| Number | Name | Date |
| --- | --- | --- |
| 1,944,959 | Valik | Jan. 30, 1934 |
| 1,965,952 | Zorn | July 10, 1934 |
| 2,047,396 | Theimer | July 14, 1936 |
| 2,125,490 | Davis | Aug. 2, 1938 |
| 2,275,312 | Tinker | Mar. 3, 1942 |